United States Patent Office 3,391,226
Patented July 2, 1968

3,391,226
ALPHA-HYDROXYALKYLPHOSPHONATES
Gail H. Birum, Kirkwood, and Rodney B. Clampitt, St. Louis, Mo., assignors to Monsanto Company, St. Louis, Mo., a corporation of Delaware
No Drawing. Filed June 11, 1964, Ser. No. 374,270
13 Claims. (Cl. 260—931)

ABSTRACT OF THE DISCLOSURE

Chlorine and bromine-containing hydroxyalkyl alpha-hydroxyalkyl-phosphonate esters useful as flame retardants in a polymeric composition such as polyurethanes are prepared by reacting a halo/haloalkyl dioxaphospholane with alkanecarboxaldehyde and subsequent reaction of the product with water and alkanecarboxaldehyde to open the phosphonate ester ring structure and form the halogen-containing hydroxyalkyl alpha-hydroxyalkylphosphonate ester.

---

This invention relates to organic phosphorus compositions which are especially suited for use in polyurethanes and other polymer systems as reactive flame-retardants. More particularly, this invention provides a new and economical process for preparing reactive hydroxyalkyl alpha-hydroxyalkylphosphonate esters, and the resulting product mixtures as new compositions of matter for the use of such compositions as flame-retarding components in polymerization recipes used to prepare polymer compositions generally, e.g., polyurethanes, polyesters, polyepoxides, polyamides, polycarbonates, etc.

In polyurethanes, for example, producers thereof have bene incorporating phosphorus as a flame retardant in the form of various phosphorus compounds and compositions into polyurethane-forming ingredient mixtures. It is known that flame resistance may be imparted to polyurethane materials by incorporating unreactive phosphorus compounds such as esters thereof, e.g., the trialkyl phosphates such as triethyl phosphate, trimethyl phosphate, and tris(2-chloroethyl)-phosphate, into the polyol-polyisocyanate reactant mixture. However, polyurethane materials containing phosphorus in unreacted form, i.e., not chemically bonded to the polymer chain, suffer the disadvantage of being susceptible to loss of the phosphorus compound by volatilization, by leaching out by solvents or water, or by being squeezed out by pressure over a period of time. Such materials also have the disadvantage of plasticizing or softening the polyurethane product, thus harming important physical properties of the polyurethane.

Polyester polyols and organic polyols containing phosphorus ester groups chemically bonded therein have also been used to incorporate phosphorus into polymer systems such as polyurethanes. This has been done, e.g., by treating phosphoric acid with ethylene oxide or propylene oxide and reacting the resulting phosphorus-containing ester polyol with the polyisocyanate to form the polyurethane. Polyphosphoric acid has been treated in a similar manner to obtain polyester polyols for use in polyurethanes. However, polyurethanes made with such materials are deficient either because of possible degradation by moisture, or because of lowering of desired physical properties of the polyurethane by using enough of the phosphorus-containing ester polyol to achieve the desired flame-resistance. Most of the presently commercial products of this type contain at least two or three hydrolyzable phosphorus ester linkages that can be coupled in the polymer backbone for each phosphorus atom. Other phosphorus compounds which might be useful for imparting flame-resistance to polymer systems are often not compatible with the catalyst systems used to prepare the polymer, and react therewith to deactivate or reduce the activity of the catalyst. A few examples of such phosphorus compounds include tris(2-chloroethyl) phosphite, triphenyl phosphite, and tris(2,3-dibromopropyl) phosphate. It is desirable, therefore, to find organic phosphorus compounds which have sufficient difunctionality and which have as few hydrolyzable ester groups per phosphorus atom as is practicable so that the phosphorus may be chemically affixed into the polymer system in a stable form while at the same time providing for the use of as low an amount as possible of the phosphorus compound to impart to the polymer system the desired flame-resistant property without substantially impairing the good physical properties of the polymer system to which it is added.

Briefly, we have found by this invention new and reactive difunctional mixtures and a process for making such mixtures by reacting sufficient water and an alkanecarboxaldehyde with a neutral phospholane ester to open the phospholane ester ring structure and to form a difunctional hydroxyalkyl α-hydroxyalkylphosphonate product mixture. The difunctional product mixture thus obtained has the advantage over prior art materials of having only one or less phosphorus ester linkage that can be coupled in the polymer backbone per phosphorus atom whereas most of the prior art products contain two or three such ester linkages per phosphorus atoms. The products of this invention also have moderately high phosphorus content (average of about 15.5%) compared to 12.5 percent or lower for most prior art materials. The products of this invention, as prepared herein, are mixtures which are especially useful in polymer systems and impart excellent flame-resistance to the polymer system for small quantities of the product incorporated into, e.g., polyurethanes.

The preferred embodiment or mode of preparing the alpha-hydroxyalkylphosphonate product mixtures of this invention involves four general steps, comprising (a) reacting a trivalent phosphorus trihalide such as phosphorus trichloride, phosphorus tribromide, and mixtures thereof including phosphorobromidochloridites with an alkylene glycol having from 2 to about 6 carbon atoms and having the glycol hydroxyl groups on adjacent carbon atoms, (b) reacting the resulting reaction product mixture of step (a) with an alkylene oxide having from 2 to about 6 carbon atoms and having the epoxy group in the terminal position, i.e., in the 1,2-position, in sufficient amount to react with at least some, i.e., from about one-twentieth to substantially all, of the phosphorus bonded halogens, (c) reacting the reaction product of step (b) with sufficient alkanecarboxaldehyde to react with substantially all of any remaining phosphorus bonded halogen, (d) reacting the reaction product of step (c) with sufficient water and alkanecarboxaldehyde to open any cyclic phosphite ester rings and form the alpha-hydroxyalkylphosphonate product mixture, which may be used as such in polyurethane forming recipes or which may be treated with a material which reacts with or neutralizes the acid moieties present in the mixture such as an epoxide or a basic material to give a product having an acid number sufficiently low to be acceptable to polyurethane producers.

A neutralizing agent as used in this invention means any material which has the chemical nature or characteristic of being able to reduce the acidity present when the neutralizing agent is admixed with the product mixture as obtained from step (d) of the above described process.

The theoretical mole ratio requirement of the several reactants used in this preferred process may be visualized from the following equation which sets forth the relative proportions of the reactants. For chemical and economic reasons the actual quantities of each reactant may vary somewhat from the amounts shown by this equation:

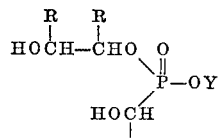

where Y is

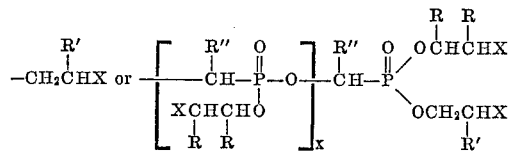

where X is chlorine or bromine, each R is hydrogen or an alkyl group of from 1 to about 4 carbon atoms provided that when both R groups are alkyl the total carbon content of the two R groups is not more than about 4 carbon atoms, R' is hydrogen or an alkyl group having from 1 to about 4 carbon atoms, R'' is hydrogen or an alkyl group having from 1 to about 3 carbon atoms, $m$ and $n$ are relative ratio numbers where the value of $m$ varies from $n$ to about $n/20$, and $x$ is an average number ranging from 0 to about 18, depending upon the value of $m$. For example, when $m=n$, Y is largely

when $m=n/2$, $x$ is about 0; when $m=n/3$, $x$ averages about 1; and when $m=n/10$, $x$ averages about 8. It is preferred to conduct the process using $m$ quantities of the alkylene oxide and water ranging from about $n$ to about $n/3$. The following chemical equations represent the desired reactions of the preferred four-step process of this invention when $m=n/2$. For these equations, simple examples of each reactant and desired products are given for purposes of illustration only, and they are not given with the intent to limit the scope of the claimed process and product more than has been stated above.

STEP 1

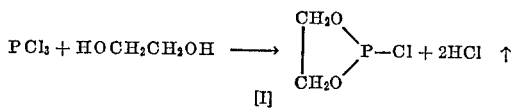

STEP 2

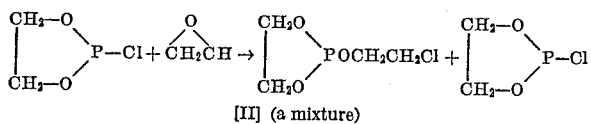

[II] (a mixture)

STEP 3

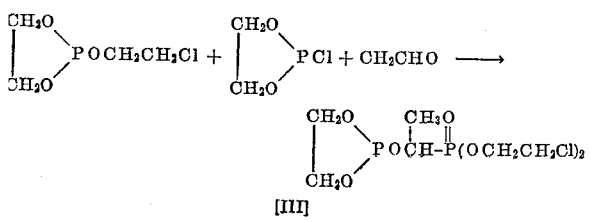

STEP 4

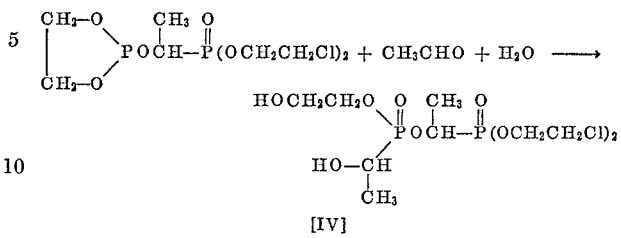

The reactants should be mixed in the order indicated by the above four equations. The water reactant of Step 4 may be added after all of the aldehyde for Steps 3 and 4 has been added, simultaneously with the aldehyde used in Step 4, or in solution with part of the aldehyde reactant.

In conducting the first step of the process it is preferred to use an excess of the phosphorus trihalide reactant, generally in quantities ranging up to about 25 percent excess relative to the amount of alkylene glycol reactant, with molar excesses of between about 5 percent to 15 percent being preferred, although stoichiometric quantities may be used if desired. The excess phosphorus trihalide is usually added in excess to compensate for material swept out of the reaction vessel by the hydrogen halide by-product. A small excess of the glycol over the stoichiometric quantity may be used without seriously affecting the product, but this is not preferred. Very little heating or cooling is required since the heat of vaporization of the hydrogen halide and return of phosphorus trihalide condensate almost balance the heat of reaction. The temperature used for this step may vary from about 0 to 80°, but 10 to 50° is preferred. Atmospheric pressure is ordinarily used, but elevated pressures, say up to about ten atmospheres, may be employed. When the mixing is completed, any remaining hydrogen halide and excess phosphorus trihalide may be removed, e.g., by gradually reducing the pressure and warming the mixture moderately, say at 15 to 60°. (Care should be taken in this first step to insure that water does not come into contact with the reaction product since the mixture with water is explosive.) The crude product, thus obtained, is largely 2-halo-1,3,2-dioxaphospholane.

In the second step of this process the crude 2-halo-1,3,2-dioxaphospholane reaction product of Step 1 is treated with sufficient alkylene oxide, depending on the molecular weight desired for the final product, to convert from about one twentieth to all of the halophospholane product to a 2-haloalkyloxy-1,3,2-dioxaphospholane. It is preferred to conduct the addition and reaction of the alkylene oxide with the 2-halo-1,3,2-dioxaphospholane product of Step 1 at about 0 to 50° C. although somewhat lower and higher temperatures may be used.

In conducting Step 3 of the process the alkane-carboxaldehyde reactant is added gradually to the reaction product of Step 2 while cooling. It is preferred to allow the temperature to rise gradually from about 25°–35° at the start of addition to about 70° C. or 80° C. at the end, although any temperature sufficient to avoid cessation of reaction or decomposing of any substantial amount of material in the reaction mixture may be used. Since the viscosity of the reaction mixture increases, it may be desirable with some reactant combinations to add an inert nonreactive diluent or solvent to reduce the viscosity. Diluents or solvents which may be used in the process of this invention include any nonreactive inert material which can be substantially completely removed from the reaction product mixture, for example, ethylene dichloride, carbon tetrachloride, benzene, and toluene. However, we prefer to operate without the diluent and to cool the mixture as described above. Since aldehyde is also used in Step 4 of this process we prefer to add an excess of aldehyde in Step 3, say, up to 50% molar excess, to insure essentially complete reaction of the phosphorus-bonded chlorine or bromine. After such addition, hydrolyzable halogen is usually present only in very minor amounts, e.g., only to the extent of about 0.1 percent or less. However, less of an excess of aldehyde may be used in this step if desired.

In conducting Step 4 it is preferred to add a solution of the water reactant in the alkanecarboxaldehyde reactant to the reaction product of Step 3 at temperatures of about 20 to 80° C., although the water and alkanecarboxaldehyde reactants may be mixed with such reaction product separately, admixed, or in solution at higher or lower temperatures, say, 0° C. to about 100° C. The amount of water used in Step 4 may vary from about 10 percent to about 100% of theory but generally it is between about 40% to 85% of the theoretical amount. As indicated above, the water may be added after all of the aldehyde, simultaneously with part of the aldehyde, or in solution with part of the aldehyde. In the preferred mode of operating this process the amount of water used is about 60–90% of the stoichiometric amount calculated for the desired reaction indicated above.

After the water and aldehyde have been added, the reaction mixture may be used as such for flame-retarding polymer systems. It is preferred, however, to first subject it to a mild vacuum stripping operation, say to a pot temperature of about 50–70° C. at 0.1–100 mm. of pressure before using it. The resulting product performs well, e.g., as a flame-retarding material at concentrations as low as 3 to 5 percent by weight in polyurethane foam compositions. The quality of the fire-retardant material may be improved, however, by first neutralizing part or all of the acidity present. It is preferred to neutralize the product with a basic material to an acid number sufficiently low to make the product acceptable to the users of the material in polymer systems. If the material is neutralized to an acid number below about 15, it is usually sufficient for most applications. However, for some applications it is desired to reduce the acid number as much as possible, say to 0 to 5. Many basic materials may be used to accomplish this neutralization. For practical reasons of economics and to avoid undue contamination of the product with unwanted impurities, it is preferred to neutralize the product mixture with cheap alkali metal and alkaline earth metal hydroxides, carbonates, oxides, and alcoholates (alkoxides), or with ammonia and organic tertiary amines. Examples of the most economical and most readily available basic materials of these types which may be used include sodium hydroxide, calcium oxide, sodium acetate, sodium methoxide, sodium ethoxide, potassium and sodium carbonates, ammonia, tert-trialkylamines such as trimethylamine, triethylamine, tripropylamines, as well as pyridine, N-methylmorpholine, picoline, N-methylcyclohexylamine, etc. Reduction of the acidity may also be accomplished by treatment with epoxides, e.g., ethylene oxide, propylene oxide, butylene oxides and higher homologues. If needed, the acidity may also be reduced by ion exchange resins. Those skilled in the art are well able to determine which is the best neutralizing agent or basic material to use to neutralize the reaction mixture product of this invention. In our operation of the process, we prefer to use a solution of sodium methylate (sodium methoxide) in methanol or a lower trialkylamine such as trimethylamine, triethylamine or ammonia. After neutralization, it may be advantageous to again strip the reaction mixture to a pot temperature of, say, 40–100° C. at reduced pressure.

Analytical data, particularly P³¹ nuclear magnetic resonance spectra of the intermediate reaction products, indicate that several structures other than those desired may be present in the final product. Such structures that may be obained when the reactants used in the process are PCl₃, ethylene glycol, ethylene oxide, acetaldehyde, water, and sodium methoxide are listed below:

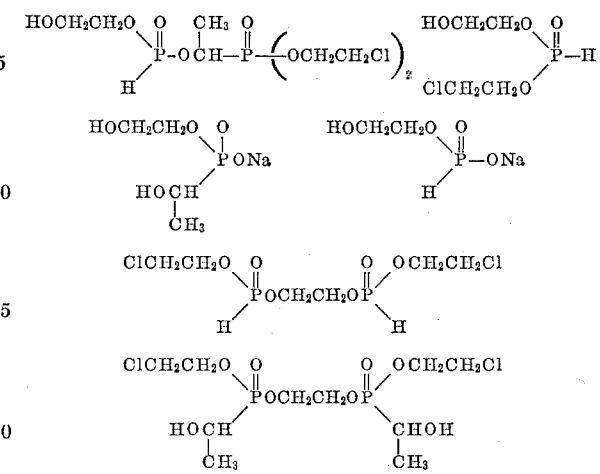

Alternatively, the process may be conducted by reacting (1) a 2-halo-1,3,2-dioxaphospholane ester wherein the halogen in the 2 position of the phospholane ring is chlorine or bromine with (2) an alkanecarboxaldehyde having from 1 to about 4 carbon atoms, and (3) a neutral trivalent phosphorus ester having at least one ester radical thereof being either an alkyloxy group having from 1 to about 6 carbon atoms, a chloroalkyloxy group having from 2 to about 6 carbon atoms, or a bromoalkyloxy radical having from 2 to about 6 carbon atoms, the remaining groups on the neutral trivalent phosphorus ester being either alkoxy having from 1 to about 6 carbon atoms, chloroalkyloxy having from 2 to about 6 carbon atoms, bromoalkyloxy radicals having from 2 to about 6 carbon atoms, or alkyl groups having from 1 to about 6 carbon atoms, in about equimolar proportions until the heat of reaction has subsided, and then reacting this resulting reaction product with sufficient alkanecarboxaldehyde and water as described above to open the phospholane ester ring and to form the desired alpha-hydroxyalkylphosphonate.

The part of this alternative process which involves the reaction of the 2 - halo - 1,3,2-dioxaphospholane, aldehyde, and neutral trivalent phosphorus ester may be accomplished according to the procedure described in U.S. Patent 3,014,948 which issued Dec. 26, 1961. The alternative process of this invention involves the use of those materials as intermediates or reactants for preparing the difunctional products of this invention. The treatment of those intermediate materials with acetaldehyde and water according to the process of this invention is the same as the above described Step 4.

For reasons of cost and availability it is preferred to use phosphorus trichloride as the phosphorus trihalide reactant in Step 1 of the preferred process. However, phosphorus tribromide may also be conveniently used as well as mixed phosphorobromidochlorides, if desired to obtain increased flame-resistance in the polymer system to which the product is added.

The alkylene glycols used in Step 1 are those having the glycol hydroxyl groups on adjacent carbon atoms, and preferably have from 2 to about 6 carbon atoms, although alkylene glycols having somewhat more carbon atom content may be used if desired. Examples of alkylene glycols which may be used include ethylene glycol, 1,2-porpylene glycol, 1,2-butylene glycol, 2,3-butylene glycol, 1,2-pentylene glycol, 2,3-pentylene glycol, 3-methyl-1,2-pentylene glycol, 1,2-hexylene glycol, 2,3-hexylene glycol, 3,4-hexylene glycol, etc.

The terminal alkylene oxides used in Step 2 of the preferred process of this invention likewise preferably have from 2 to about 6 carbon atoms. Alkylene oxides having more carbon atoms could be used but the use of such materials reduces the flame retardant effectiveness of the final product. Hence, we prefer to limit the alkylene oxide reactant to such materials as ethylene oxide, propylene oxide, 1,2-butylene oxide, 1,2-pentylene oxide, 3-methyl-1,2-pentylene oxide, and 1,2-hexylene oxide.

The alkanecarboxaldehydes used in Steps 3 and 4 of the preferred process of this invention preferably have from 1 to 4 carbon atoms therein, although longer chain alkanecarboxaldehydes could be used in the reaction. For reasons of simplicity of operation of the process it is desirable to use the same aldehyde in Step 4, as was used in Step 3, although this is not necessary. However, since it is perferred to add an excess of the aldehyde in Step 3 to insure complete reaction of all phosphorus-bonded halogen therein, it is easier to use a common aldehyde in both steps, the excess aldehyde used in Step 3 merely being carried over for reaction along with any additional aldehyde with water and the intermediate products of Step 3 for formation of the alpha-hydroxy-alkylphosphonate product in Step 4. Examples of aldehydes which may be used include formaldehyde, acetaldehyde, propionaldehyde, butyraldehyde, and isobutyraldehyde. Mixture of aldehydes may also be used. Lower dialkyl ketones such as acetone and methyl ethyl ketone could be used but with less advantageous results.

The water used in Step 4 of the process may be distilled or ordinary tap water. Since side reactions occur with the first three steps, and the desired phospholane structure are usually present in less than theoretical quantities in the Step 3 product, somewhat less than the theoretical amount of water is needed to complete the reaction in Step 4. The amount needed generally varies from about 60 to 90% of theory, depending on the types and ratios of reactants used. It may sometimes be advantageous to prepare products that contain some unreacted Step 3 product as a mixture with ordinary Step 4 product. This can conveniently be done by using less water than the amount that is normally required to complete the reaction, say as little as 10% of theory. The hydroxyl content of the final product can be regulated in this way.

The presently provided alpha-hydroxyalkyl-phosphonate product mixture are useful for a variety of industrial purposes, e.g., as pre-ignition inhibiting agents in organo-lead containing hydrocarbon fuels, such as gasoline compositions containing tetraethyl-lead used in internal combustion engines, and as additives to hydrocarbon lubricant oil based compositions to enhance the anti-wear and extreme pressure uses of the lubricant oil. However, they are particularly useful for imparting flame resistance to polymeric materials. For this purpose, they are most conveniently used by incorporating them into polymerization mixtures where they react with one or more of the polymer ingredients to affix themselves to the polymer chain. They are particularly useful in polyurethane type polymerization recipes where they may be incorporated into the reaction mixture in quantities ranging from about 0.1 percent to about 10 percent by weight to impart good flame resistance to the resulting polymer system without substantially effecting the good physical properties of the polyurethane composition.

The invention is further illustrated in its various aspects by the following typical specific examples which are given to illustrate various reaction conditions and methods of operation which may be used. They are not intended to be limiting on the scope of process, product, and uses thereof.

Example 1

A 3-liter flask equipped with a thermometer, stirrer, Dry Ice condenser and graduated addition funnel was charged with 1265 g. (9.2 moles, 15% excess) of $PCl_3$. Ethylene glycol, 496 g. (8.0 moles), was then added above the surface in 1.1 hours (the addition was started at 25°, and when the temperature had fallen to 15°, slight warming was used to keep it at 15–20° during the remainder of the addition). The Dry Ice condenser was then replaced with an air-cooled condenser. The reaction mixture was warmed to 25° in 0.1 hour, water pump vacuum was applied, warming was continued to a pot temperature of 41°/10 mm., condenser water was turned on and the reaction mixture was refluxed for 0.5 hour at a pot temperature of 37–38°/8 mm. (73 g. of crude $PCl_3$ was collected in a Dry Ice trap during this stripping operation). The crude chlorophospholane intermediate contained 27.8% of hydrolyzable chlorine (theory, 28.0%). The $P^{31}$ n.m.r. spectrum had a major peak at −168.3 p.p.m., a minor peak at −179.7 p.p.m., and a minor doublet at −23.2 and +6.2 p.p.m. (Caution: 2-chloro-1,3,2-dioxaphospholane is explosive with water, and no operation should be carried out under conditions that could allow water to come into contact with it.)

The product from Step 1 was cooled to 30°, and 176 g. (4.0 moles) of gaseous ethylene oxide was added below the surface with nitrogen in 0.25 hour with cooling at 24–30°. When the cooling bath was removed at the end of the addition, heat of reaction raised the temperature from 28–35° in 0.1 hour. ($P^{31}$ n.m.r.: major peaks at −169.5 and −134.3 p.p.m.; minor peaks at −167.4 and −140.1 p.p.m.; small doublet at −23.5 and +6.2 p.p.m.).

The reaction mixture was stirred at 34–35° for 0.25 hour, and then 264 g. (6.0 moles) of redistilled acetaldehyde was added below the surface in 0.55 hour with cooling at 34–70° (one-fourth at 34–45° in 0.15 hour, one-fourth at 45–60° in 0.15 hour, one-fourth at 60–65° in 0.1 hour and the remainder at 65–70° in 0.15 hour). The reaction mixture was stirred and allowed to cool to 54° in 0.5 hour ($P^{31}$ n.m.r.: major peaks at −137.1 and −22.9 p.p.m.; minor peaks at −141.6, −134.1 and +6.6 p.p.m. Infrared bands: 2975–2900 cm.$^{-1}$. 1470–1380 cm.$^{-1}$; 1260 cm.$^{-1}$; 1210, 923 810–720 cm.$^{-1}$; 1110–960 cm.$^{-1}$. A solution of 57.6 g. of tap water in 132 g. of redistilled acetaldehyde was then added with cooling at 53–57° in 0.4 hr. (the first half of the addition was made slowly in 0.25 hour to aid cooling, and then the rate of addition was increased as heat of reaction diminished). The mixture was stirred for 0.1 hour, and it was then stripped at 50–55° by slow reduction of pressure to 10 mm. and finally warmed to 75°/10 mm. to give 1502 g. of a colorless liquid (molecular weight: 472 by vapor pressure osmometry in acetonitrile; $P^{31}$ n.m.r.: −26.9 and −21.3 p.p.m.). The acidity of the residue was measured by non-aqueous potentiometric titration, and then a 1350 g. portion was stirred and cooled at 50–55° as 162 g. of a 25% solution of sodium methylate in methanol (the calculated amount for neutralization) was added in 0.25 hour. The reaction mixture was stirred for 0.1 hour more and then stripped as before to give 1392 g. of colorless product; $n_D^{25}$ 1.4792; total acidity, 1.4 mg. KOH/g.

*Analysis.*—Calcd. for $C_{10}H_{22}Cl_2O_8P_2$: C, 29.8; H, 5.5; Cl, 17.6; P, 15.4; OH, 8.4. Found: C, 28.8; H, 5.7; Cl, 16.4; P, 15.4; OH, 6.9.

The $P^{31}$ n.m.r. spectrum had major peaks at −27.4 and −21.7 p.p.m. and a minor peak at +6 p.p.m.

| Assignments: | Infrared bands, cm.$^{-1}$ |
|---|---|
| OH | 3390 |
| CH | 3000–2900 |
| $CH_2$, $CH_3$ | 1460–1380 |
| P=O | 1240 |
| P—O—C | 1080, 1030, 965 |

Example 2

In this run the same procedure was used as in Example 1 except that the product was not stripped before sodium methoxide was added. A colorless liquid was obtained having the following properties: $n_D^{25}$ 1.4827; acid No. 17; $P^{31}$ chemical shifts, −27.8 and −22.2 p.p.m.; P, 15.5%; Cl, 16.7%; OH, 7.1%.

Example 3

Following a procedure similar to Example 1 except that one-third more acetaldehyde was used in the water addition step and then triethylamine instead of sodium methylate was added for neutralization, a product was obtained having the following properties: $n_D^{25}$ 1.4862; $P^{31}$ chemical shifts: major peaks, −27.5 and −21.6 p.p.m.; minor peaks, −24.5, −15.7 and +5.3 p.p.m.; P, 15.4%; Cl, 17.4%; OH, 6.9%.

Example 4

A 5-liter flask equipped with a thermometer, stirrer, Dry Ice condenser and addition funnel was charged with 2210 g. (16.1 moles) of $PCl_3$. Ethylene glycol, 868 g. (14.0 moles), was then added above the surface in 2.25 hours (the addition was started at 25°, and when the temperature had fallen to 16°, slight warming was used to keep the temperature at 16–20° for the remainder of the addition). The Dry Ice condenser was replaced with a 15-inch air-cooled condenser, water pump vacuum was applied and the reaction mixture was warmed to 47°/23 mm. in 0.4 hour. Condenser water was turned on, and the product was refluxed for 0.5 hours (final pot temperature, 41°/11 mm.) to give crude 2-chloro-1,3,2-dioxaphospholane. The product was cooled to 21° and the water condenser was replaced with the Dry Ice condenser. Gaseous ethylene oxide, 308 g. (7.0 moles), was then added below the surface in 0.3 hour with cooling at 15–21°. When the cooling bath was removed, heat of reaction raised the temperature to 32° in about 0.1 hour. The raction mixture was warmed to 45°, 875 g. of ethylene dichloride solvent was added, and then 462 g. (10.5 moles) of redistilled acetaldehyde was added below the surface in 0.7 hour with cooling at 45–50°. When the cooling bath was removed, heat of reaction raised the temperature to 60° in 0.2 hour. The mixture was warmed at 60–65° for 0.5 hour and then cooled to 30°. An additional 308 g. (7.0 moles) of acetaldehyde was added rapidly, and then 101 g. (5.6 moles) of distilled water was added in 0.3 hour with cooling at 26–29° (this addition was made slowly until heat of reaction diminished after about two-thirds had been added). The reaction mixture was warmed to 50°, stripped by gradual reduction of pressure to a pot temperature of 60°/0.2 mm. and held at this temperature for 0.2 hour to give 2647 g. of light yellow liquid. This product was dissolved in 800 g. of ethylene dichloride, and then 426 g. of 25% sodium methylate in methanol (the calculated amount for complete neutralization) was added in 0.3 hour with cooling at 24–27°. The reaction mixture was warmed to 50° and then stripped as before to give 2726 g. of colorless product $n_D^{25}$ 1.4817, acid number 0.9, and containing OH, 6.6%; P, 15.7%; and Cl, 16.0%. The $P^{31}$ n.m.r. spectrum had major peaks at −27.8 and −21.9 p.p.m. and a minor peak at +6 p.p.m.

| Assignments | Infrared bands, cm.$^{-1}$ |
|---|---|
| OH (alcohol) | 3390 |
| CH (aliphatic) | 3000–2900 |
| $CH_2$, $CH_3$ | 1460–1380 |
| P=O | 1240 |
| P—O—C | 1080, 1030, 965 |

Example 5

A 5-liter flask was charged with 2210 g. (16.1 moles) of $PCl_3$, and 868 g. (14.0 moles) of ethylene glycol was added above the surface in 2.75 hours at 16–20°. The Dry Ice condenser was replaced wtih an air-cooled condenser, water pump vacuum was applied and the mixture was warmed to 47°/25 mm. in 0.35 hour. Condenser water was turned on and the reaction mixture was refluxed for 0.5 hour to a final pot temperature of 40°/11 mm. The product was cooled to 20°, and 308 g. (7.0 moles) of ethylene oxide was added below the surface with nitrogen in 0.7 hour at 15–20°. Heat of reaction raised the temperature to 28° in 0.1 hour. Ethylene dichloride (875 g.) was added, and then 462 g. (10.5 moles) of freshly distilled acetaldehyde was added below the surface in 0.9 hour (the addition was started at 40° and the temperature was then kept at 45–50° by cooling). Heat of reaction raised the temperature to 60°, and the product was warmed at 60–65° for 0.3 hour more. The reaction mixture was cooled to 41°, and an additional 308 g. (7.0 moles) of acetaldehyde was added rapidly below the surface. Distilled water, 101 g. (5.6 moles, 80% of theory), was added above the surface in 0.25 hour at 35–41°. The reaction mixture was warmed in 0.4 hour to 60° and then stripped by gradual reduction of pressure to a pot temperature of 60°/0.5 mm. to give 2650 g. of colorless liquid, $n_D^{25}$ 1.4878 containing P, 16.1% and OH 8.1%.

A 309 g. portion was diluted with 150 g. of ethylene dichloride, and 50.7 g. of a 25.5% solution of sodium methylate in methanol was added in 0.1 hour at 26–28°. The mixture was warmed to 50° and stripped to 60°/0.2 mm. to give 316 g. of clear, colorless liquid, $n_D^{25}$ 1.4830, acid No. 0.8, and containing P, 15.9%; Cl, 17.3%; and 7.0% hydroxyl.

Another portion, 297 g., of the unneutralized product was dissolved in 100 g. of methanol, and the calculated quantity of 5% $NH_3$ in methanol for neutralization was added in 0.15 hour at 25–30°. The reaction mixture was warmed to 50° and then stripped to 60°/0.2 mm. to give 297 g. of product, $n_D^{25}$ 1.4882, acid No. 3.

Example 6

Operating as in Example 5 but adding only 50% of the calculated amount of water for complete reaction gave a light yellow liquid; $n_D^{25}$ 1.4902; $P^{31}$ n.m.r., −26.9, −24.1, −21.2 and +6.0 p.p.m.; P, 16.5%; Cl, 18.7%; OH, 5.4%.

Example 7

A 3-liter flask was charged with 1265 g. (9.2 moles) of $PCl_3$, and 496 g. (9.0 moles) of ethylene glycol was added in 1.7 hours at 16–20°. The reaction mixture was refluxed for 0.5 hour at 40–45° (final pressure, 10 mm.), and then 176 g. (4.0 moles) of ethylene oxide was added in 0.3 hour at 15–20°. The product was warmed to 30° C., 500 g. of ethylene dichloride was added, and then 264 g. of redistilled acetaldehyde was added in 0.5 hour (largely at 45–50°). The reaction mixture was warmed at 62–65° for 0.5 hour, cooled to 32°, and a solution of 50.4 g. (2.8 moles, 70% of theory) of distilled water in 132 g. (3.0 moles) of acetaldehyde was added in 0.4 hour at 32–40°. The total weight of reaction mixture after being warmed to 50° was 2018 g. A 1500 g. portion was treated at 25–30° with the calculated quantity of 25% sodium methylate in methanol for neutralization. Stripping of the reaction mixture to 60°/0.2 mm. gave 1565.5 g. of yellow liquid; $n_D^{25}$ 1.4846; acid No., 4.4; P, 15.5%; Cl, 17.0%; OH, 6.3%.

A 475 g. portion of the unneutralized solution was cooled at 25–30° as 57.2 g. of 4.9 N NaOH solution was added in 0.1 hour. The reaction mixture was warmed to 50° and stripped to 75°/8 mm. to give 354.5 g. of colorless liquid, $n_D^{25}$ 1.4868.

Example 8

Ethylene glycol, 930 g. (15.0 moles), was added to 2268 g. (16.5 moles) of phosphorus trichloride at 15–20° C. over a period of 1.7 hours. The reaction mixture was then fractionated to give 2-chloro-1,3,2-dioxaphospholane, B.P. 43°/9 mm. Ethylenechlorohydrin, 7.4 g., was mixed with 1472 g. of the above distillate, and then 525 g. of ethylene oxide was added in 0.7 hour with cooling at 15–20°. The reaction mixture was stripped to 42°/10 mm. to give crude 2-(2-chlorethoxy)-1,3,2-dioxaphospholane. A 341 g. portion (2.0 moles) of this phospholane ester was mixed with 132 g. (3.0 moles) of redistilled acetaldehyde, and then 36 g. (2.0 moles) of distilled water was added in 0.3 hour with cooling at 40–52°. The reaction mixture was stirred at 48–52° for 0.75 hour and then stripped to a pot temperature of 52°/1 mm. to give 427 g. of light yellow liquid having a major $P^{31}$ n.m.r. peak at —26.7 p.p.m. (relative to $H_3PO_4$) and minor peaks at —21.8, +6.6 and 8.8 p.p.m. It contained P, 14.1%; Cl, 13.9%; and OH, 15.9%.

Example 9

1,2-propanediol, 586 g. (7.7 moles), was added to 1164 g. (8.47 moles) of phosphorus trichloride at 15–20° over a period of 2 hours. Distillation of the reaction mixture gave 1005 g. (92.8% yield) of 2-chloro-4-methyl-1,3,2-dioxaphospholane, B.P. 43–44°/9 mm., $P^{31}$ n.m.r. chemical shift —172.2 p.p.m. Ethylene chlorohydrin, 5 g., was mixed with the distillate, and then 353 g. of ethylene oxide was added below the surface in 0.6 hour at 15–20°. The reaction mixture was warmed at 40–50° for 0.5 hour and then stripped to a pot temperature of 50°/16 mm. to give 1320 g. of crude 2-(2-chloroethoxy)-4-methyl-1,3,2-dioxaphospholane having a major $P^{31}$ n.m.r. peak at —137.0 p.p.m. and a minor peak at —141.7 p.p.m.

A 359 g. portion (1.94 moles) of the above phospholane ester was mixed with 107 g. (2.43 moles) of freshly distilled acetaldehyde, and then 35 g. (1.94 moles) of distilled water was added in 0.5 hour at 30–40°. The reaction mixture was warmed at 40–50° for 0.75 hour and then stripped to a pot temperature of 55°/16 mm. to give 474 g. of colorless liquid. Propylene oxide was then added at 45–50° until there was no further evidence of heat of reaction. The reaction mixture was warmed at 45–50° for an additional hour, and it was then stripped to a pot temperature of 60°/16 mm. to give 557 g. of colorless product having a major $P^{31}$ n.m.r. peak at —26.9 p.p.m. and containing 10.6% phosphorus, 12.3% chlorine and 14.0% alcoholic hydroxyl.

Example 10

Ethylene glycol 496 g. (8.0 moles) was added to 1210 g. (8.8 moles) of phosphorus trichloride at 15–20° in 1.1 hours. The reaction mixture was stripped for 0.5 hour at 23–25°/15.20 mm. Ethylene oxide, 176 g. (4.0 moles), was added at 25–30° in 0.3 hour, and then 264 g. (6.0 moles) of freshly distilled acetaldehyde was added in 0.7 hour as the temperature was allowed to gradually increase to 70°. The reaction mixture was stirred at 65–70° for 0.2 hour, and then a solution of 57.6 g. (3.2 moles of tap water in 132 g. (3.0 moles) of redistilled acetaldehyde was added in 0.35 hour at 65–70°. The mixture was stripped to 70°/10 mm., and then the calculated amount of 25% sodium methylate in methanol for neutralization of the titratable acidity was added at 70–75° C. Concentration of the reaction mixture to 75°/10 mm. gave a colorless liquid; $n_D^{25}$ 1.4766; acid No. 1.0; P, 15.5%; Cl, 15.1%; OH, 7.7%.

The acid number of a product is the number of milligrams of KOH required to neutralize 1 gram of the sample being analyzed to a phenolphthalein end point.

The amount of water reactant used with the alkanecarboxaldehyde to open the 1,3,2-dioxaphospholane ring structures is preferably the minimum required to obtain the desired degree of reaction. To avoid formation of any substantial quantities of hydrolytic degradation products, gross excesses of the water reactant should be avoided, i.e., the amount of water used should be insufficient to cause undesired side reactions.

What is claimed is:

1. Hydroxyalkyl alpha-hydroxyalkylphosphonate esters of the formula

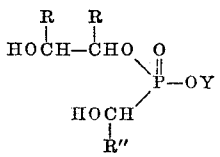

wherein Y is selected from the group consisting of

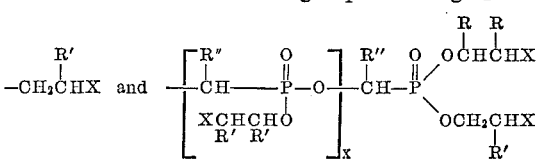

wherein X is selected from the group consisting of chlorine and bromine, each R is independently selected from the group consisting of hydrogen and alkyl of from 1 to about 4 carbon atoms provided that when both R substituents are alkyl the total carbon content of the two R substituents is not more than about 4 carbon atoms, R' is selected from the group consisting of hydrogen and alkyl having from 1 to about 4 carbon atoms, R" is selected from the group consisting of hydrogen and alkyl having from 1 to about 3 carbon atoms, and $x$ is an average number ranging from zero to about 18.

2. The ester according to claim 1 wherein Y is

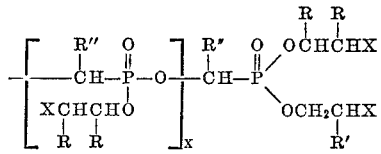

3. The ester according to claim 1 wherein Y is

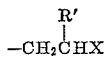

4. The ester according to claim 3 wherein one R substituent is hydrogen, the remaining R substituent is —$CH_3$, R' is hydrogen, R" is —$CH_3$ and X is chlorine.

5.

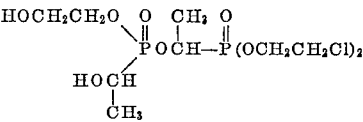

6.

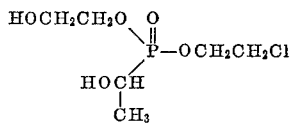

7.

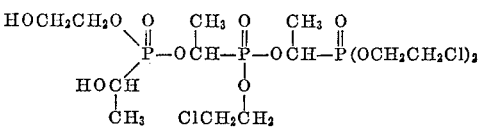

8. A process for preparing a halogen-containing hydroxyalkyl alpha-hydroxyalkylphosphonate product mixture which comprises (a) reacting in the absence of water and at a temperature from about zero to 80 degrees centigrade at least a stoichiometric amount of a phosphorous trihalide selected from the group consisting of phosphorous trichloride, phosphorous tribromide, and mixtures thereof, with an alkylene glycol having from 2 to about 6 carbon atoms and having the glycol hydroxyl groups on adjacent carbon atoms to form as a reaction product a 2-halo-1,3,2-dioxaphospholane ester, (b) reacting at about zero to about 50 degrees centigrade the reaction product of step (a) with a 1,2-alkylene oxide having from about 2 to about 6 carbon atoms in an amount to form as a reaction product at least some 2-haloalkyl-1,3,2-dioxaphospholane ester, wherein the halogen is the same as that in the phosphorous trihalide used in step (a) and the alkyl group has from 2 to about 6 carbon atoms, (c) reacting at a temperature of about 25 to about 80 degrees centigrade the reaction product mixture of step (b) with an alkanecarboxaldehyde having from 1 to about 4 carbon atoms to react with substantially all of any remaining phosphorous bonded halogen, and (d) reacting at a temperature of about zero to about 100 degrees centigrade the reaction product of step (c) with an alkanecarboxaldehyde having from 1 to about 4 carbon atoms and water to open phospholane ester rings and to form the hydroxyalkyl alpha-hydroxyalkylphosphonate ester product.

9. A process as described in claim 8 wherein the reaction product obtained from step (d) is treated with neutralizing agent to lower the acid number of the product of step (d) to about 15 or lower.

10. A process as described in claim 9 wherein the neutralizing agent used to lower the acid number of the reaction product of step (d) is a basic material selected from the group consisting of alkali metal and alkaline earth metal hydroxides, alkali metal and alkaline earth metal lower alkoxides, alkali metal and alkaline earth metal basic salts, ammonia, and tertiary alkylamines.

11. A process which comprises:
(a) reacting in the absence of water and at a temperature from about zero to 80 degrees centigrade at least a stoichiometric amount of phosphorus trichloride with ethylene glycol to form a reaction product containing 2-chloro-1,3,2-dioxaphospholane, (b) reacting at about zero to about 50 degrees centigrade the reaction product of step (a) with ethylene oxide in an amount to form as a reaction product a mixture of 2-chloro-1,3,2-dioxaphospholane and 2-chloroethyl-1,3,2-dioxaphospholane, (c) reacting at a temperature of about 25 to about 80 degrees centigrade the reaction product mixture of step (b) with acetaldehyde to react with substantially all of any phosphorus bonded chlorine, and (d) reacting at a temperature of about zero to about 100 degrees centigrated the reaction product of step (c) with acetaldehyde and water in the amount of about 10 to about 100 of theory to open phospholane ester rings and to form hydroxyethyl alpha-hydroxyethylphosphonate ester product.

12. A process as described in claim 11 wherein the reaction product of step (d) is treated with an acid neutralizing agent to lower the acid number of the reaction product to about 15 or below.

13. A process for preparing a chlorine or bromine-containing hydroxyalkyl alpha-hydroxyalkylphosphonate ester product mixture which comprises reacting at a temperature from about zero to about 100 degrees centigrade alkanecarboxaldehyde and water in an amount from 10 to about 100% of theory with a neutral 1,3,2-dioxaphospholane ester to open the phospholane ester ring structure and form a halogen-containing hydroxyalkyl alpha-hydroxyalkylphosphonate ester.

No references cited.

CHARLES B. PARKER, *Primary Examiner.*
A. H. SUTTO, *Assistant Examiner.*

UNITED STATES PATENT OFFICE
CERTIFICATE OF CORRECTION

Patent No. 3,391,226

July 2, 1968

Gail H. Birum et al.

It is certified that error appears in the above identified patent and that said Letters Patent are hereby corrected as shown below:

Column 1, line 34, "bene" should read -- been --. Column 3, line 62, "+$CH_2CH$" should read -- +$CH_2CH_2$ --; line 69, "+$CH_2CHO$" should read -- +$CH_3CHO$ --. Column 5, line 30, "70° C." should read -- 75° C. --; line 75, "obained" should read -- obtained --. Column 6, line 68, "porpylene" should read -- propylene --. Column 7, line 43, "mixture" should read -- mixtures --. Column 8, line 37, "$cm.^{-1}$." should read -- $cm.^{-1}$). --. Column 11, line 41, "15.20 mm." should read -- 15-20 mm. --; line 46, "(3.2 moles" should read -- (3.2 moles) --. Column 12, line 7, "R'R'" should read $$\begin{array}{cc} | & | \\ R & R \end{array}$$

Column 14, line 11, "100" should read -- 100% --; line 25, "halogen-containing" should read -- chlorine or bromine-containing --.

Signed and sealed this 16th day of December 1969.

(SEAL)
Attest:

EDWARD M. FLETCHER, JR.
Attesting Officer

WILLIAM E. SCHUYLER, JR.
Commissioner of Patents